April 21, 1931. K. I. MILLER 1,801,932
AUTOMATIC WATER FOUNTAIN FOR POULTRY
Filed July 18, 1927 2 Sheets-Sheet 1

INVENTOR
Kinney I. Miller
BY Adam E. Fisher.
ATTORNEY.

April 21, 1931. K. I. MILLER 1,801,932
AUTOMATIC WATER FOUNTAIN FOR POULTRY
Filed July 18, 1927 2 Sheets-Sheet 2
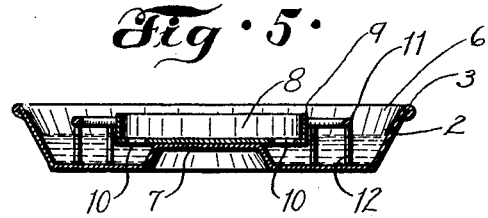
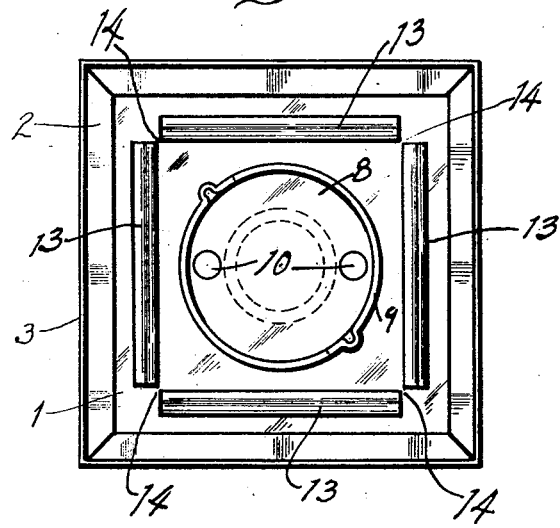
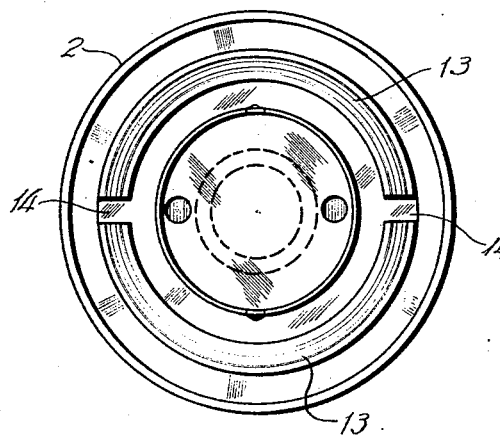
INVENTOR
Kinney I. Miller
By Adam E. Fisher.
ATTORNEY Patented Apr. 21, 1931

1,801,932

UNITED STATES PATENT OFFICE

KINNEY I. MILLER, OF LANCASTER, MISSOURI

AUTOMATIC WATER FOUNTAIN FOR POULTRY

Application filed July 18, 1927. Serial No. 206,410.

This invention relates to automatic water fountains for poultry, of the style employing a water container inverted in a shallow pan, so that gravity and atmospheric pressure cooperate in maintaining at all times a certain level of water in the pan. There are a number of fountains of this kind now on the market, and they are sufficiently practicable for the larger sized fowls, but in actual use it has been found that the smaller chicks frequently hop up over the rim of the pan, and become wedged in between the said rim and the neck of the water container and are so killed.

It is the object of the present invention, therefore, to provide for a water fountain of the kind described and embodying a suitable water container mounted centrally within a water pan having a raised rim, a chick guard element consisting of a ring or annular rib or boss of somewhat less height than the said rim, and arranged within the pan intermediate of the rim thereof and the said container so as to prevent small chicks from becoming jammed in the fountain in the manner referred to.

Other objects and advantages will be disclosed in the course of the following specification.

In the drawing

Figure 5 is a sectional detail of a modification showing the guard ring supported upon stems extended up from the bottom of the water pan;

Figure 6 is a plan view of a modified structure showing the employment of semi-circular guard ribs, spaced apart at their ends for allowing water to flow through between them;

Figure 7 is a plan view of a modified rectangular structure.

Figure 3:
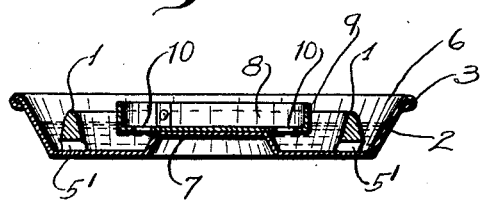
Figure 3 is a cross section through the pan.
Figure 1:
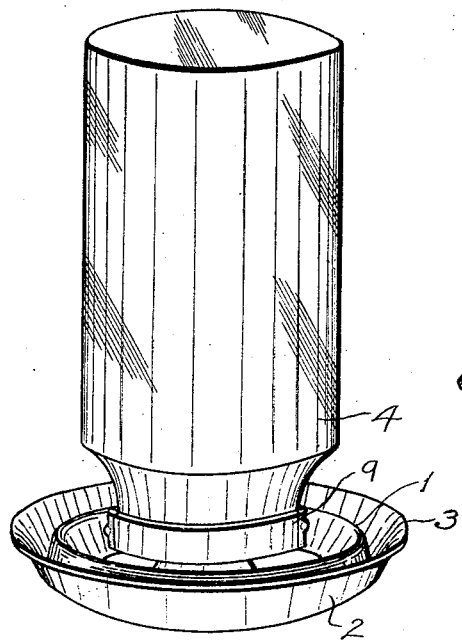
Figure 1 is a perspective view of an automatic water fount equipped with my improved form of pan.
Figure 4:
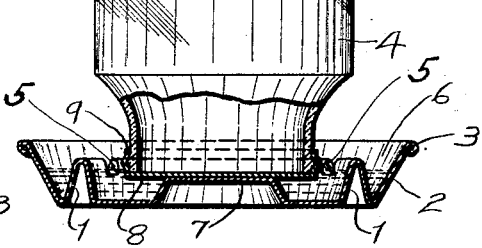
Figure 4 is a sectional detail showing how the guard rib may be formed integrally with the material of the pan.
Figure 2:
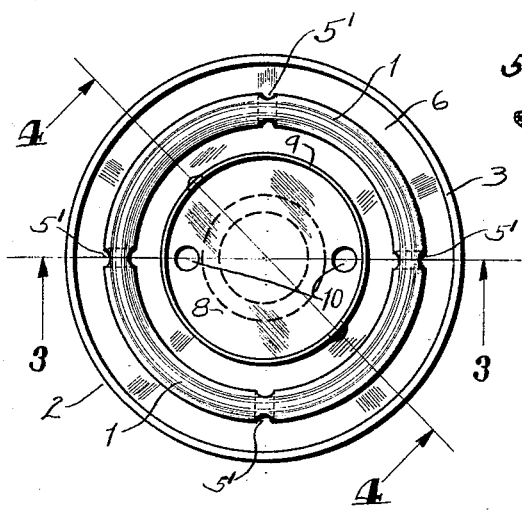
Figure 2 is a plan view of the pan alone.

In combination with the conventional shallow water pan 2 and centrally mounted water container 4, the primary feature of my invention resides in the provision of a guard ring 1 located concentrically between the said container and the rim 3 of the pan. This ring 1 is preferably of less height than the rim 3, is of blunt formation along its ridge so as to avoid danger of injuring the chicks, and is provided with a number of overflow and underflow slots 5 and 5' respectively to allow water to flow freely over or under the ring into the trough 6 formed between the ring 1 and rim 3. The ring 1 may be formed separately and simply laid loosely within the pan, or it may be soldered or otherwise secured in place, or it may be stamped up integrally from the bottom of the pan, as shown in Figure 4, or, if the pan 2 be formed of molded glass or other molded material, the ring 1 may be molded integrally therewith. The pan 2 is formed with a conventional central boss 7 upon which is mounted the usual plate 8 having a rim 9 for engaging the neck of the container 4, and having the apertures 10 through which the water or other fluid substance may flow out into the pan 2.

In use, the smallest chicks can readily drink at this fountain, and owing to the presence of the ring 1, are prevented from becoming wedged in the apparatus and so killed, in manner pointed out in relation to the usual structures of this kind; and at the same time plenty of horizontal head room for the chicks is provided for immediately over the trough, between the container 4 and the pan rim 3.

In the modification shown in Figure 4, the guard rib 1 is shown pressed up integrally from the material of the pan, the top of the rib being buckled in as shown at 5 to allow water to flow over at these points.

In the modification shown in Figure 5, the guard rib 1 is replaced with a wire ring 11 supported from the bottom of the pan 2 upon short stems 12.

In the modification shown in Figure 6, semi-circular ribs 13 are employed in lieu of the continuous, annular guard ribs, the segments being spaced apart and thus providing water openings 14 thereinbetween them.

In the modification shown in Figure 7, the structures are shown as rectangular instead of circular.

While I have here pointed out particular embodied forms of my invention, it is understood that I may make any desired minor changes in the structures shown and their assembly as may be expedient in practice, not departing from the spirit of the invention, as defined in the appended claims.

I claim:

1. A water fount for chicks comprising a pan open throughout the entire circumference and having a bottom and a continuous outer wall and provided with a raised support spaced from the outer wall and of a height less than the same, a water container mounted upon and supported by the raised support and projecting outwardly beyond the same in spaced relation with the bottom of the pan, and a guard rib mounted on the bottom of the pan and intermediately disposed between the outer wall and the container and surrounding the container to prevent chicks from becoming wedged in the space between the projecting portion of the container and the pan, said rib being of less height than the rim of the pan and provided with water passages to permit water to flow in the open pan from one side of the rib to the other.

2. A water fount for chicks comprising a pan open throughout the entire circumference and having a bottom and a continuous outer wall and provided with a raised support spaced from the outer wall, and of a height less than the same, a water container mounted upon and supported by the raised support and projecting outwardly beyond the same in spaced relation with the bottom of the pan, and a guard rib surrounding the water container and mounted on the bottom pan intermediately between the water container and the outer wall of the pan and being of a height less than the rim of the pan and greater than the raised supporting portion of the pan and arranged to prevent chicks from becoming wedged in the space between the projecting portion of the water container and the bottom of the pan, said guard rib being provided with means to permit water to flow in the open pan from one side of the guard rib to the other.

3. A water fount for chicks comprising a pan open throughout the entire circumference and having a bottom and a continuous outer wall and provided with a raised support spaced from the outer wall and of a height less than the same, a water container mounted upon and supported by the raised support and projecting outwardly beyond the same in spaced relation with the bottom of the pan, and a guard rib surrounding the water container and mounted on the bottom pan intermediately between the water container and the outer wall of the pan and being of a height less than the rim of the pan and greater than the raised supporting portion of the pan and arranged to prevent chicks from becoming wedged in the space between the projecting portion of the water container and the bottom of the pan, said guard rib being cross-sectionally tapered and formed integral with the pan and provided with slots arranged to permit water to flow in the open pan from one side of the rib to the other.

In testimony whereof I affix my signature.

KINNEY I. MILLER.